United States Patent [19]

Larson

[11] Patent Number: 5,268,397

[45] Date of Patent: Dec. 7, 1993

[54] CROSSLINKABLE ASSOCIATIVE POLYMERS PREPARED FROM POLYISOCYANATES AND HYDROXYL-FUNCTIONAL COMPOUNDS

[75] Inventor: Donald B. Larson, Chalfont, Pa.

[73] Assignee: Rohm and Haas Company, Philadelphia, Pa.

[21] Appl. No.: 935,148

[22] Filed: Aug. 24, 1992

Related U.S. Application Data

[63] Continuation of Ser. No. 598,575, Oct. 15, 1990, abandoned, which is a continuation of Ser. No. 71,113, Jul. 8, 1987, abandoned, which is a continuation of Ser. No. 583,073, Feb. 22, 1984, abandoned, which is a continuation-in-part of Ser. No. 353,674, Mar. 1, 1982, abandoned.

[51] Int. Cl.$^5$ ............... C08F 2/50; C08F 283/06; C08F 120/36
[52] U.S. Cl. .................... 522/97; 525/454; 526/301
[58] Field of Search ............. 522/97; 525/454; 526/301; 427/507, 520

[56] References Cited

U.S. PATENT DOCUMENTS

| | | | |
|---|---|---|---|
| 3,297,745 | 1/1967 | Fekete | 526/301 |
| 3,850,770 | 11/1974 | Juna | 525/455 |
| 3,867,329 | 2/1975 | Halpern | 128/341 |
| 3,907,865 | 9/1975 | Miyata | 522/90 |
| 3,939,105 | 2/1976 | Jones | 528/48 |
| 4,139,436 | 2/1979 | Jasani | 522/97 |
| 4,324,575 | 4/1982 | Levy | 522/97 |
| 4,672,956 | 6/1987 | Potter | 427/2 |
| 4,689,015 | 8/1987 | Denyer | 522/97 |

*Primary Examiner*—Susan Berman
*Attorney, Agent, or Firm*—Brian W. Stegman

[57] ABSTRACT

This invention relates to water-compatible crosslinkable associative polymers prepared from (1) hydrophilic hydroxyl compounds having a number average molecular weight greater than about 3000 and less than about 20,000, (2) hydrophobic polyisocyanates and (3) hydroxyl-functional vinyl compounds. The polymers can be polymerized by radiation, or by free radical, redox, or thermal initiation, in water or as a film dried from water (or other solvents) on a substrate.

12 Claims, No Drawings

5,268,397

CROSSLINKABLE ASSOCIATIVE POLYMERS PREPARED FROM POLYISOCYANATES AND HYDROXYL-FUNCTIONAL COMPOUNDS

This application is a continuation of application Ser. No. 07/598,575, filed Oct. 15, 1990, now abandoned, which is a continuation of application Ser. No. 06/071,113, filed Jul. 8, 1987, now abandoned, which is a continuation of application Ser. No. 06/583,073, filed Feb. 22, 1984, now abandoned, which is a continuation-in-part of application Ser. No. 06/353,674, filed Mar. 1, 1982, now abandoned.

BACKGROUND OF THE INVENTION

This invention relates to water-compatible polymers containing both hydrophilic and hydrophobic segments. The hydrophobic segments in turn contain reactive groups. In water, the hydrophobic portions of the polymer tend to associate bringing the chemically reactive groups which they bear in closer proximity than would be expected if the reactive groups were merely randomly distributed within the water. These water-compatible polymers can be further polymerized through the reaction of the chemically reactive groups. This further polymerization can be accomplished by either free radical initiators acting through radiative, redox, or thermal mechanisms or alternatively by ionizing radiation (e.g., electron beam) alone.

The crosslinking characteristics of the polymers of the instant invention can be contrasted to the frequently encountered situation in which polymers are crosslinked in a random fashion. Random crosslinking can occur, for example, either because the initiator or crosslinkable groups are distributed in the polymer in a random fashion. Specific examples include electron beam or ultraviolet irradiation cure of hydrocarbon polymers, hydrogen abstraction from such polymers by benzophene, and vulcanization of natural rubber. The result of random crosslinking is a broad distribution of molecular weight between crosslinks, with the smaller molecular weights segments determining in general the strength of the crosslinked polymer network. That is, as a number average molecular weight between crosslinks decreases, the polymer's modulus increases. See D. W. Van Crevelen, *Properties of Polymers*, Elsevier, N.Y., 1972 at 161-62. However, as the molecular weights between crosslinks decreases, eventually the point is reached at which the chain statistics of that portion of the chain between crosslinks is no longer well approximated by the classical random flight model as the crosslinked network tends to lose its elastomeric properties. See, for example, J. D. Ferry, *Viscoelastic Properties of Polymers*, John Wiley & Son, 399-402, (1961). For example, permanent hydrogels prepared from low molecular weight monomers and crosslinkers are generally friable when prepared from low concentrations of monomers and crosslinkers. Furthermore, the monomers used to prepare these permanent hydrogels are generally toxic (e.g., acrylamide). The polymers of the instant invention permit the preparation of networks with a fixed minimum molecular weight between crosslinks. This minimum molecular weight, fixed by the length of the hydrophilic segments, resolves the dilemma encountered by the polymer chemist seeking to prepare a truly elastomeric network of high modulus. This is because the length of the hydrophilic segment can be chosen to be long enough to confer elastomeric properties yet short enough to maximize the density of crosslinks, which in turn is proportional to the modulus.

Linear reactive polymers containing both hydrophilic and hydrophobic segments with reactive groups directly bonded to the hydrophobic portions of the polymer are known in the art. For example, U.S. Pat. No. 3,907,865 discloses linear polymers prepared by reacting polyethylene oxide diols, having molecular weight of less than 500, with diisocyanates and hydroxyethyl(meth)acrylates as well as branched polymers prepared using multi-ols of molecular weight from about 2000 to about 3000 in place of the diols. These polymers can be used with reactive diluent and photosensitizers to produce ultraviolet cured printing plates and release coatings. The molecular weight of the hydrophilic segments of these polymers is restricted to a low value; otherwise, photocuring becomes problematic as the concentration of the reactive groups decreases.

An example of polyethylene oxide-based polymers with a random distribution between crosslinking sites is taught by U.S. Pat. No. 4,047,936. Here copolymers of ethylene oxide and allyl glycidyl ether were prepared giving a random distribution of reactive groups along the polymer. These materials can be contrasted to those disclosed by U.S. Pat. No. 3,867,329 in which polyethylene oxide molecules which have been transesterified give terminal (meth)acrylate groups are described. Although the molecular weight between crosslinks in the corresponding polymer network is fixed by the length of the polyethylene chains, no association of reactive groups occurs prior to formation of the network because these reactive polymers do not contain hydrophobes adjacent to the reactive groups.

Another group of reactive polymers is described in U.S. Pat. Nos. 3,939,105 and 3,939,123. Here reactive polymers are prepared from polyethylene oxide and molecular weight less than 25,000 and diisocyanates such that the reactive groups are terminal residual isocyanate groups. Cure of the reactive polymers dissolved in organic solvent is by reaction with crosslinkers such as organic polyamine in amounts equivalent to the residual isocyanate groups. These polymers, which are not disclosed to be radiation curable, must be stored under anhydrous and inert atmosphere conditions.

Concentration of reactants by absorption or solubilization techniques in micelles is known. For example, see A. Blumstein, "Polymerization in Preoriented Media" in Pasika (Editor), Advances in *Macromolecular Chemistry*, Vol. 2, Academic Press, New York (1970) and the references in J. H. Fendler, "Interactions and Reactions in Reverse Miceller Systems", *Accounts of Chemical Research*, Vol. 9, (4), 153 (1976). The ultraviolet polymerization of a reactive monomer in liquid crystalline media containing initiators is also known. *Molecular Crystals and Liquid Crystals*, Vol. 12, 215-27, (1971). Concentration of reactive monomer into monolayers, e.g., octadecylacrylate at a nitrogen-water interphase, and the polymerization of the monolayer by electron beam radiation is also known. M. Hatada, et al., *Macromolecules*, Vol. 8 (1), 19-22 (1975).

SUMMARY OF THE INVENTION

This invention relates to crosslinkable associative water-compatible polymers which contain reactive groups which can be polymerized by a free radical mechanism. These polymers are prepared from (1) a polyethylene oxide diol having a molecular weight from about 2000 to about 20,000, (2) a diisocyanate and (3) a hydroxylethyl (meth)acrylate. The free radical polymerization can be initiated thermally, by redox reaction, or by radiation. The polymerization can occur in solution, in a colloidal suspension, in a film dried from water or another solvent, on a substrate impregnated or coated with the water solution or film dried from the water or other solvent.

This invention uses the associative behavior in water of hydrophobic groups, which are spatially widely separated along an otherwise hydrophilic polymer, to concentrate reactive groups, which are placed adjacent to the hydrophobic groups, into micelles and presumably other liquid crystalline structures. The concentrated reactive groups are polymerized by a free radical mechanism. The product of the polymerization depends upon the structure of the reactive polymer (i.e., mono-functional, multi-functional, molecular weight), the concentration of the reactive polymer, initiation variables, the properties of any substrate material (e.g., sand, fiber, metal, etc.), non-functional surfactants or surface active materials present, whether cured as dry film from water or a solution in water, as well as how the crosslinked material is treated after cure (e.g., air-dried, freeze-dried, dried under tension, partially dried, etc.).

The association of reactive groups in the reactive polymers of this invention allow polymer crosslinking to occur even at very low absolute concentrations of reactive groups at a very fast rate. This association also permits curing of water solutions or of films dried from water solutions. Any of the art-known methods of free radical initiation can be used to cure the associative reactive groups and thus the reactive polymers. These associative groups provide a means for obtaining a more uniform crosslinking of the reactive polymers in comparison with the random, non-selective crosslinking mechanisms known in the art. Moreover, these crosslinkable associative polymers are relatively non-toxic, non-volatile and stable materials.

DETAILED DESCRIPTION OF THE INVENTION

This invention relates to crosslinkable associative water-compatible polymers having reactive groups which are directly connected to the hydrophobic portion of the polymer. In water, the hydrophobic segments of these polymers tend to associate. The reactive groups, located within the hydrophobic segments of the polymer, are susceptible to free radical polymerization.

The crosslinkable associative water-compatible polymers of this invention are typically prepared from a polyethylene oxide diol of molecular weight from about 2000 to about 20,000 optionally in the presence of a low level of polyethylene oxide triol by reaction with diisocyanates and hydroxyethyl (meth)acrylates. These crosslinkable associative water-compatible polymers are formed by free radical polymerization using radiative, redox, or thermal initiation. This invention uses the associative behavior in water of hydrophobic groups widely separated along an otherwise hydrophilic polymer. This association concentrates reactive groups, which are adjacent to or near the hydrophobic groups, into micelles or other associative structures such as liquid crystalline phases. The reactive groups, so concentrated, can then be polymerized by free radicals (electron beam alone or ultraviolet with photosensitizer), redox, or thermal catalyst systems.

The crosslinkable associative polymers of this invention vary in physical properties, such as solution viscosity, depending upon the structure of the reactive polymer (i.e., mono-functional or multi-functional, molecular weight, and the like). The physical properties of the crosslinked polymer depend on the structure and concentration of the associative polymer, the crosslinking initiation variables, the properties of any substrate material present (e.g., sand, fiber, metal, and the like), and any non-reactive surface active materials present. The crosslinkable associative polymers are cured as dried films from water, in solutions, in water, or in an aqueous suspension. After curing the polymer may be air-dried, freeze dried, dried under tension, partially dried and the like.

A preferred embodiment of this invention comprises essentially linear crosslinkable associative polymers prepared by reacting, in any order, condensation reactants comprising (a) a hydrophilic hydroxyl compound of number average molecule weight greater than about 3000 and less than about 20,000; (b) a hydroxyl-functional monomer; and (c) a hydrophobic multi-isocyanate.

Another preferred embodiment of this invention comprises the reaction product of a, b and c above having the formula

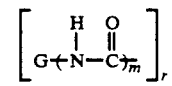

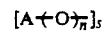

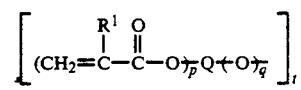

wherein
r, s, and t are integers,
m is 2 or 3, n is 1, 2, or 3
p is 1 or 2, q is 1, 2 or 3; with the proviso that fewer than one unit per number average molecule has m, n, or q equal 3;
G is the residue of an organic di- or tri-isocyanate;
Q and A, are independently residues of a mono-, di-, or trihydroxyl alcohol or mono-, di-, or trihydroxyl polyether;
$R^1$ is hydrogen or methyl; the order of the groups of the formula not being significant except as required by the condensation polymerization reaction and the total number of carbon atoms in Q and G being 12 or more; and provided that the number average molecular weight of hydrophilic hydroxyl condensation reactant precursors to said polymer is greater than 3,000 and less than about 20,000.

This formula is semi-empirical rather than structural in the sense that it does not purport to represent exactly each of the structures within the embodiment. However, the variety of structures within this embodiment is fixed and is easily determinable by the requirements that each of the three bracketed residues must be connected to another by a bond resulting from a condensation reaction; that the subscript integers assume the stated values, and that fewer than one unit per number average molecule has n, m or q equal to 3. This latter requirement means that there is, on the average, less than one branch point per molecule. This requirement will be met, for example, by a collection of 95% three-armed star molecules and 5% linear molecules.

Another example is given by assuming that p, q,=1; m, n, s, t,=2; and r=3. With these selections, the only structural formula possible is

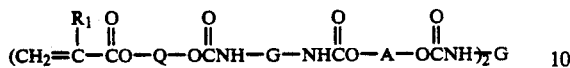

Yet another example is given by assuming that p, q, s, t=1; m, n, r=2 for 85% of the molecules and p, q, s=1; r=2; m=3; and t=4 for the remainder. These selections yield a mixture of linear molecules with a structural formula given by

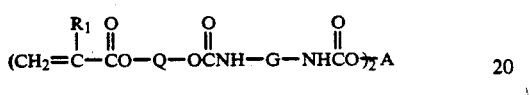

and doubly branched molecules of the formula

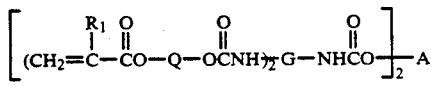

A more preferred embodiment of this invention comprises essentially linear crosslinkable associative polymers prepared by reacting A. at least one high molecular weight alcohol selected from
1) a monohydroxyl hydrophilic polymer of the formula

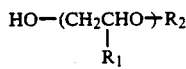

wherein
  $R_1$ is a hydrogen atom or a methyl group, preferably a hydrogen atom,
  $R_2$ is a $C_1$ to $C_{20}$ alkyl group, preferably a methyl group, and
  n is an integer from 5 to about 500, preferably from about 50 to about 300; and
2) a dihydroxyl hydrophilic polymer of the formula wherein

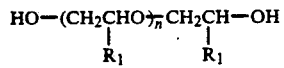

$R_1$ is a hydrogen atom or a methyl group, preferably a hydrogen atom, and
  n is an integer from about 50 to about 500, preferably from about 100 to about 250; and,
B. at least one functional alcohol selected from
1) a compound of the formula

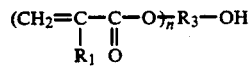

wherein
  $R_1$ is a hydrogen atom or a methyl group,
  n is an integer from 1 to 4, preferably 1 or 2,
  $R_3$ is a $C_2$ to $C_{20}$ alkyl group, preferably a $C_2$ to $C_5$ alkyl group,
  most preferably the functional alcohol is hydroxyethyl acrylate or hydroxyethyl methacrylate; and
2) a compound of the formula

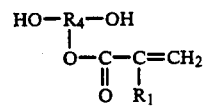

wherein
  $R_4$ is

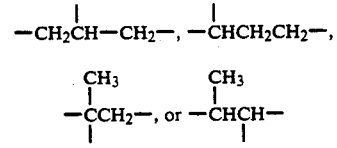

$R_1$ is a hydrogen atom or a methyl group;
and then reacting this product with
C. at least one polyisocyanate preferably a diisocyanate such as
  1,4-tetramethylene diisocyanate
  1,6-hexamethylene diisocyanate ("HDI")
  2,2,4-trimethyl-1,6-diisocyanatohexane
  1,10-decamethylene diisocyanate
  1,4-cyclohexylene diisocyanate
  4,4'-methylenebis(isocyanatocyclohexane) ("Hylene W")
  1-isocyanato-3-isocyanatomethyl-3,5,5-trimethylcyclohexane
  m- and p-phenylene diisocyanate
  2,6- and 2,4-tolylene diisocyanate ("TDI")
  xylene diisocyanate
  4-chloro-1,3-phenylene diisocyanate
  4,4'-biphenylene diisocyanate
  4,4'-methylene diphenylisocyanate ("MDI")
  1,5-naphthylene diisocyanate
  1,5-tetrahydronaphthylene diisocyanate
  $C_{36}$ dimer acid diisocyanate sold under the brand name "DDI", based on dimer acids as discussed in *J. Am. Oil Chem. Soc.* 51, 522 (1974)
wherein the total relative equivalents of alcohol functions selected from A and B to isocyanate functions is in the range of 0.8 to 1.2 and wherein the weight average number of carbon atoms in the diisocyanate plus the weight average number of the carbon atom in $R_2$ and $R_3$ is 12 or more.

Another preferred embodiment is to react about 0.5 relative equivalent of an alcohol selected from A-1 and about 0.5 relative equivalent of a functional alcohol from B-1 with about 1.0 equivalent of a diisocyanate from C.

Another preferred embodiment is to react about 0.02 to about 0.4 equivalent of a functional alcohol from B-1 and about 0.98 to 0.6 equivalent of a dihydroxyl from A-2 with about 1.0 equivalent of diisocyanate from C.

Another preferred embodiment is to react about 0.5 (or up to 0.6) equivalent of a functional alcohol from B-2 and about 0.5 equivalent of dihydroxyl from A-2 with about 1.0 equivalent of diisocyanate from C. Some of the 0.5 equivalent of functional alcohol from B-2 may be substituted for by a functional alcohol from B-1.

Another preferred embodiment relates to the process for preparing essentially nonlinear crosslinkable associative polymers which comprises substituting in any of the above preferred embodiments alcohol from A-2 with at least one of the following.

A-2' a polyol (>2 hydroxyls) selected from polyalkylolalkanes such as trimethylolpropane or trimethylolbutane, hydroxy compounds having ether linkages such as the erythritols, (di-pentaerythritol, tripentaerythritol, and the like) and hydroxyalkanes containing three or more hydroxy groups, such as glycerol, butanetetraol, sorbitol, mannitol, and the like.

A-2" a multihydroxy (>2 hydroxyls) hydrophilic polymer derived from the ethoxylation of the polyols of A-2' thus giving polymers of the formula wherein

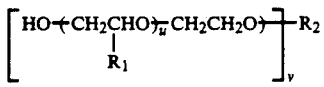

$R_1$ is a hydrogen atom or a methyl group, u times v is equal to from about 50 to about 500, v being an integer less than 10, preferably the integers 3 or 4, $R_2$ is a $C_4$ to $C_{10}$ alkyl group, wherein the total equivalents of A-2' or A-2" substituted for A-2 is in the range of 0.01 to 0.3 equivalent.

Another preferred embodiment relates to the process for preparing essentially nonlinear crosslinkable polymers with comprises substituting in any of the above embodiments using an alcohol E selected from A-2, a multiisocyanate (isocyanate group>2) for some of the diisocyanate from C selected from such as follows:

C'. polymethylene polyphenylisocyanates sold under the brand name "PAPI" such as "PAPI 135" (equivalent weight of 133.5 and average isocyanate functionally of 2.7) and "PAPI 901" (equivalent weight of 133 and average isocyanate functionality of 2.3)

aromatic triisocyanate adduct of trimethylol propane and tolylene diisocyanate sold under the brand name "Mondur CB-75".

aliphatic triisocyanate product of the hydrolytic trimerization of 1,6-hexamethylene diisocyanate, sold under the brand name "Desmodur N", wherein the total equivalents of E substituted for C is in the range of 0.01 to 0.3 equivalent.

When curing the reactive polymers of the present invention, the percent solids can be from about 100% solids to about 1% solids in solution. Although water is the preferred solvent, ($C_1$–$C_4$) alcohols or other appropriate solvents may also be utilized either alone or in conjunction with water, the restriction being that the reactive groups are sufficiently associated.

Various additives may also be utilized in the curing of the reactive polymers of this invention. For example, initiators from about 0 to about 10%, based upon polymer solids, can be utilized depending on the initiation scheme chosen for the reactive polymers. Preferably these initiators are somewhat water insoluble although water miscible initiators are also encompassed by this invention.

Ionic salts from about 0 to about 10%, based on polymer solids, may also be utilized during the curing process of the present invention.

Non-curable micelle-forming materials may be utilized from about 0 to about 80% based on non-curable material plus reactive polymer. Surfactants in general and associative thickeners (exemplified in U.S. Pat. No. 4,079,028) are the preferred non-curable micelle forming materials that may be utilized in the curing of the reactive polymers of this invention.

Non-curable non-micelle forming materials may be utilized from about 0 to about 100% based on the reactive polymer solids. Typical non-curable non-micelle forming materials would include preservatives, antioxidants, bactericides, controlled release materials, soluble polymer, emulsified or latex polymer, and the like.

Inert or reactive substrates such as sand, sawdust, paper, fiber, cloth, methal, wood, glass, plastic and the like may also be utilized during the curing of the reactive polymers of this invention.

As used in the specification and claims of this application, "water-compatible" means water-soluble or capable of being suspended in water.

In a preferred embodiment of this invention the dilute acrylate functionality (less than 0.1% in a 10% polymer solution) is concentrated. This is accomplished by hydrophobe association into micelles. These same micelles also solubilize a water insoluble photoinitiator, for example diethoxyacetophenone (DEAP). When irradiated with ultraviolet light, photoinitiator in the micelles of acrylate functional hydrophobes absorbs the light and initiates a free radical reaction that polymerizes the micelle.

Cure converts the fluctuating network of physically associated polymer hydrophobes of a 10% water solution into a permanent tough hydrogel of polymerized hydrophobes and thus a network of crosslinked polymer molecules. For dried films, cure polymerizes the inhomogeneities of acrylate functional hydrophobe associates in a matrix of polyethylene oxide thus converting the dry, water-soluble film into a water-insoluble, water-swellable film.

The reaction is extremely fast compared to the usual 100% ultraviolet curable systems used in coatings. Moreover, there is a minimal oxygen inhibition at the surface and this can be easily reduced by reacting the components in a nitrogen atmosphere.

The following examples are provided merely to illustrate the preparation and use of the crosslinkable associative polymers of the present invention and are not to be interpreted in any way as being limitations on the breadth or scope of this invention.

PREPARATION EXAMPLES

EXAMPLE 1

A mixture of 122 g. of Carbowax ® E-6000 polyethylene glycol (eq. wt. of 3800), a product of Union Carbide Corporation, 150 g of toluene and 0.13 g of dibutyltin dilaurate was heated in a flask to distill off the water-toluene azeotrope into a Dean Stark trap with upper layer return. When no more water was distilled over, the mixture was cooled to 60° C. and 0.93 g of hydroxyethyl acrylate was added, followed by 5.24 g of DMD (4,4'-dicyclo-hexylmethane diisocyanate). After 27 hours at 60° C., the mixture was poured into a slab mold and air dried.

Examples 2 to 19 were prepared following the procedure disclosed in Example 1 above.

Other solvents may be used. They should be inert to isocyanate and capable of dissolving the polyoxyalkylene reactant and urethane product at reaction temperature. Suitable inert solvents include non-active hydrogen containing compounds such as benzene, toluene, xylene and other well-known solvents rich in aromatic hydrocarbons such as the solvents sold under the trademarks "Solvesso 100" or "Solvesso 150", as well as esters such as ethyl acetate, butyl acetate and "Cellosolve" acetate and dialkyl ethers of ethylene glycol, diethylene glycol, and the like. Other well-known solvents can also be used.

TABLE I

Examples of Crosslinkable Acrylate-Functional Associative Polymers

| Example No. | Composition (in equivalents)* |
|---|---|
| 1 | 0.2 HEA/0.8 E-6000/1.0 DMD |
| 2 | 0.2 HEA/0.8 E-6000/1.0 DMD |
| 3 | 0.2 HEA/0.8 E-6000/1.0 DMD |
| 4 | 0.2 HEA/0.8 E-6000/1.0 DMD |
| 5 | 0.2 ICEA/1.0 E-6000/0.8 DMD |
| 6 | 0.2 HEA/0.2 TMP/0.6 E-6000/1.0 DMD |
| 8 | 0.1 HEA/0.9 E-6000/1.0 DMD |
| 9 | 0.4 HEA/0.6 E-6000/1.0 DMD |
| 10 | 0.2 HEA/0.8 20 ML/1.0 DMD |
| 11 | 0.2 HEA/0.8 E-4000/1.0 DMD |
| 12 | 0.2 HEMA/0.8 E-6000/1.0 DMD |
| 13 | 0.2 TEADA/0.8 E-6000/1.0 DMD |
| 14 | 0.6 DHPHA/0.5 E-6000/1.0 DMD |
| 15 | 0.2 HEA/0.6 E-6000,/0.2 TMP/0.8 DMD/0.2 DDI |
| 16 | 0.6 DHPA/0.5 E-6000/0.8 DMD/0.2 DDI |
| 17 | 0.5 HEA/0.5 $C_{12}$-EO (MW-8700)/1.0 DMD |
| 18 | 0.5 HEA/0.5 Methoxy Carbowax ® 5000$^a$/1.0 DMD |
| 19$^b$ | 0.1 HEA/0.2 TMP/0.1 $C_{14}$OH/0.6 E-6000/1.0 DMD |
| 20 | 0.2 HEA/0.8 E-6000/1.0 DMD |
| 21 | 0.2 Dodecanol/0.8 E-6000/1.0 Tolylene Diisocyanate |

*Based on determined equivalent weights.
The following abbreviations are used in Table I and in subsequent tables:
HEA = hydroxyethyl acrylate
E-6000 = polyethylene oxide of nominal molecular wt. 6000
DMD = 4,4'bis(isocyanatocyclohexyl) methane
ICEA = isocyanatoethyl acrylate
TMP = triethylolpropane
20 ML = polyethylene oxide of mole wt. 20,000
E-4000 = polyethylene oxide of mole wt. 4,000
HEMA = hydroxyethyl methacrylate
TEADA = triethanolamine diacrylate
DHPA = dihydroxypropyl acrylate
DDI = dimer acid diisocyanate
$^a$a mono alcohol from EO adduct of methanol having MW 5000
$^b$Post-reacted with ethanol to insure all isocyanate reacted

EVALUATION PROCEDURES

Solid associative crosslinkable polymer is added to water which is being stirred on a mechanical stirrer; stirring is continued until it is dissolved. Water-soluble additives may be predissolved in the water before adding the reactive polymer or after the polymer dissolves. Initiators are added, after the polymer solution is prepared, with stirring and the resultant solution is placed on a tumbler overnight.

Viscosities are measured on a Brookfield Viscometer, Model LV. Solutions are prepared for cure as indicated in the application examples. Ultraviolet (UV) cure is carried out by passing the sample on a conveyor under two medium pressure mercury arc lamps rated at 200 watt/inch of an Ashdee UV curing unit at appropriate belt speeds. Irradiation times reported are simply 60 divided by conveyor belt speed times the number of passes under lamps.

Hydrogels are evaluated by visual inspection, by applying finger pressure, and by stretching to estimate toughness and flexibility. Percent gel, gel-sol ratio, and swell ratio are calculated as shown below.

1. % gel=(weight dry gel after equilibration with excess water/weight dry gel before equilibration with water)×100.

2. gel-sol ratio=weight dry gel after equilibration with excess water/(weight dry gel before equilibration with excess water-weight of dry gel after equilibration with excess water).

3. swell ratio=(weight after equilibration with excess water-weight dry gel)/weight dry gel.

The procedure for determining the weight of the hydrogel is to add gel to a preweight aluminum weighing pan and dry overnight followed by a weighing to obtain a dry gel weight. This weight includes soluble polymer and gel polymer. The dry gel is equilibrated in excess water to extract soluble polymer; the swelled gel is filtered through a preweighed stainless steel mesh filter and a swelled gel weight is obtained. The gel is dried overnight in the filter and the two are reweighed to get a dry gel weight after equilibration with excess water.

EXAMPLES OF THE USES OF THE INVENTION

Typical examples of applications in which the crosslinkable associative polymers of the present invention can be utilized are given below. These examples are illustrative of applications of the crosslinkable associative polymers of the present invention and are not to be construed as limitations on the scope and breadth thereof.

EXAMPLE 22

The following table shows that the hydrophobe adjacent the reactive group is essential to the UV cure of the reactive polymers of this invention. Thus the polymer of Ex. 5 has a structure such that the acrylate functionality is bound directly to the poly(EO); in contrast, polymer Example 3 has an intervening hydrophobic reaction product of the 4,4'-bis(isocyanatocyclohexyl)methane group (DMD). Polymer Ex. 5 does not UV cure in the presence of the photoinitiator diethoxyacetophenone either as a dried film from water or as a water solution. On the other hand, polymer Ex. 3 converts to 90% insoluble gel polymer in both cases.

TABLE II

| Polymer | Wt. % | WT % DEAP On Polymer | Solvent | UV Exposure (sec) | Cure | % Gel |
|---|---|---|---|---|---|---|
| Example 5. .2 ICEA/1.0 E-6000 .8 DMD | 10 | 0.2% DEAP | Dry Film From 10% solution | 4 | No | 20 |
| | 10 | " | Water | 4 | No | — |
| | 15 | " | Water | 4 | No | — |
| Example 3, .2 HEA/.8 E-6000/ | 10 | " | Dry Film From 10% solution | 2 | Yes | >90 |

TABLE II-continued

| Polymer | Wt. % | WT % DEAP On Polymer | Solvent | UV Exposure (sec) | Cure | % Gel |
| --- | --- | --- | --- | --- | --- | --- |
| 1.0 DMD | 10 | " | Water | 2 | Yes | >90 |

ICEA = isocanatoethyl acrylate
E-6000 = polyethylene oxide of nominal molecular wt. = 6000
DMD = 4,4'-Bis(isocyanatocyclohexyl)methane
HEA = Hydroxyethylacrylate

EXAMPLE 23

The following table shows that micelle formation is a necessary condition for efficient cure even for reactive polymers having hydrophobes adjacent to (meth)acrylate functionality. Associative thickeners are characterized by a critical association concentration (CAC) range. This narrow range is the point at which the log viscosity vs. log polymer weight percent curve dramatically changes slope. Thickener association is thought to occur over this range, specifically polymer hydrophobe association into micelles. The associative crosslinkable polymers also exhibit this behavior and, in this CAC range, cure of the polymer solutions produces dramatically differing results from cure at less than the CAC. As shown below, polymer Example 1 converts from a no gel cure to a gel cure at about 2.4 weight percent, while polymer Example 6, with a lower CAC range, converts at a correspondingly lower concentration from no gel to gel. The gel produced at the CAC is loose and weak, containing soluble high molecular weight polymer. As the polymer concentration increases, the UV cures produce stronger gels.

TABLE III

| Polymer | Wt. % | Wt. % DEAP On Polymer | Solvent | UV Exposure | Gel Formed |
| --- | --- | --- | --- | --- | --- |
| Ex. 1, same as | 5 | 0.24 | Water | 1 sec | Yes |
| as Ex. 3 | 2.4 | 0.24 | Water | 1 | No |
| Example 6, .2 HEA/ | 5 | 0.24 | Water | 1 | Yes |
| .2 TMP/.6 E-6000/ | 1.4 | 0.24 | Water | 1 | No |
| 1.0 DMD | | | | | |

EXAMPLE 24

This example shows the effect of surfactant on cure results. To 10 g of a 10% solution of the polymer of Ex. 6 was added water and/or 27% solution of sodium lauryl sulfate (SLS), a low molecular weight micelle-forming material. As shown in the table below, viscosity of the resultant 5% solutions of reactive polymer at first increased and then decreased. The UV cure of the solutions for a given exposure changed from a stiff gel to "no visible reaction", with a stringy and thick result occurring near the maximum in viscosity. The additional micelle forming SLS is thought to reduce the concentration per micelle of the reactive functionality.

TABLE IV

| Water (g) | Wt. SLS (g) | Brookfield Visc., cps. (Spindle, 3, 60 rpm) | UV Cure Results[a] for 1 sec Exposure |
| --- | --- | --- | --- |
| 10.0 | — | 100 | Stiff gel |
| 9.0 | 1.00 | 586 | Rubbery gel |
| 8.25 | 1.75 | 830 | Rubbery, sticky gel |
| 7.50 | 2.50 | 978 | Quite sticky, still a gel |
| 6.50 | 3.50 | 974 | Very stringy, thick, sticky |
| 5.00 | 5.00 | 906 | Stringy, quite fluid |
| 2.00 | 8.00 | 514 | Still fluid, no apparent reaction |
| — | 10.00 | 422 | Still fluid, no apparent reaction |

[a] approx. 0.2% diethoxyacetophenone

EXAMPLE 25

Polymer Ex. 6 is soluble in ethanol. However, in the presence of 0.2% diethoxyacetophenone, 5% ethanol solutions do not UV cure to gel or high viscosity. The more hydrophobic nature of ethanol relative to water apparently does not allow micelles to form and/or the photoinitiator diethoxyacetophenone is more soluble in ethanol than water and thus less photoinitiator partitions in the micelles. A film dried from ethanol, however, is cured as easily as one dried from water.

EXAMPLE 26

The following table shows the effect of changing the reactive polymer composition by varying the equivalents of alcohol reactants. Two effects occur as the ratio of HEA to E-6000 increases—the reactive polymer molecular weight decreases and the percent reactive group on total polymer solids increases. The result is that for 10% solutions, viscosity of uncured solutions decreases and the UV-cured hydrogels become more friable and swell ratios decrease.

TABLE V

| Ex. | Composition (see Table I) | Weight % | Viscosity (cps.) | Wt. % DEAP on polymer | UV Exposure (sec) | Gel Description | % Gel | Gel-Sol Ratio | Swell Ratio |
| --- | --- | --- | --- | --- | --- | --- | --- | --- | --- |
| 8 | .1 HEA/.9 E-6000 1.0 DMD | 10 | 370 | .2 | 1 | clear, highly elastic | 75 | 3.0 | 47 |
| 4 | .2 HEA/.8 E-6000/ 1.0 DMD | 10 | 75 | .2 | 1 | cloudy, stiff elastic | 83 | 5.0 | 27 |
| 9 | .4 HEA/.6 E-6000/ 1.0 DMD | 10 | 38 | .2 | 1 | translucent | 91 | 9.7 | 17 |

EXAMPLE 27

The following table shows the effect on UV cure of reactive polymers prepared by poly (EO) of various molecular weights at identical equivalent weight compositions. The molecular weight changes in reactive polymer appear more dramatic for 20 ML (i.e., no reaction) than for polymer Ex. 8 of applications Ex. 24.

TABLE VI

| Polymer Ex. | Composition | Weight % | Viscosity (cps) | Description of Cure Results[a] |
|---|---|---|---|---|
| 10 | .2 HEA/.8 20 ML/1.0 DMD | 10 | 61 | no reaction |
| 4 | .2 HEA/.8 E-6000/1.0 DMD | 10 | 75 | stiff, elastic gel |
| 11 | .2 HEA/.8 E-4000/1.0 DMD | 10 | 44 | rigid, easily breakable |

[a]Sec UV exposure; approx. 0.2% diethoxyacetophenone

EXAMPLE 28

The following table compares the effects of changing the functional alcohol portion of the reactive polymer composition. Thus, replacing the acrylate HEA (polymer Ex. 1) by the methacrylate HEMA (polymer Ex. 12) changes the UV cure product from a tough, elastic gel to a loose gel. Making the reactive group a diacrylate with an amine group (polymer Ex. 13) increases the viscosity of the uncured solution and gives a UV-cured tough, elastic gel.

TABLE VII

| Polymer Ex. | Composition | Weight % | Viscosity (cps) | Wt. % DEAP on Polymer | UV Exposure (sec) | Description |
|---|---|---|---|---|---|---|
| 1 | .2 HEA/.8 E-6000/1.0 DMD | 10 | 65 | .2 | 1 | tough, elastic gel |
| 12 | .2 HFMA/.8 E-6000/1.0 DMD | 10 | 48 | .2 | 1 | loose gel |
| 13 | .2 TEADA/.8 E-6000/1.0 DMD | 5 | 187 | .2 | 1 | very elastic, tough |
| 14 | .6 DHPA/.4 E-6000/1.0 DMD | 3 | 496 | .2 | 1 | extremely fragile gel |

EXAMPLE 29

Table VII also contains polymer Ex. 14 which is prepared using a dihydroxypropyl acrylate (DHPA). A very high molecular weight reactive polymer is produced, having a viscosity of 500 cps at 3% polymer solids. The acrylate functionality can now occur along the polymer backbone as well as at the ends. The higher viscosity may be due to the fact that these "internal" reactive hydrophobes contain two reacted diisocyanate groups and thus would be expected to build viscosity more efficiently than terminal reactive hydrophobes with only one reacted diisocyanate group.

EXAMPLE 30

Polymer Example 6 is a branched associative cross-linkable polymer since some of the diol E-6000 is replaced by the triol trimethyolpropane (TMP). As shown in Example 23 this polymer has a lower CAC range and has higher solution viscosities than the linear polymer Example 1. UV cure (1 sec) of polymer solutions in the 5-10 weight percent range (significantly above the gel-no gel cure concentration) initiated by approximately 0.2% diethoxyacetophenone gives much tougher and more elastic gels than the linear polymer Example 1.

EXAMPLE 31

Replacement of reactive polymer by nonreactive polymer produced somewhat the same results as in applications Ex. 24 as shown in the table below:

TABLE VIII

| Total 6% Polymer Ex. 1 | Percent of Non-Reactive Associative Polymer[a] | UV Cure Results[b] at 1 sec Exposure |
|---|---|---|
| 100% | — | stiff elastic gel |
| 60% | 40% | stiff elastic gel |
| 40% | 60% | less stiff gel |
| 20% | 80% | very stringy, viscous |

[a]Polymer Example 21
[b]0.2% Diethoxyacetophenone

EXAMPLE 32

Polymer Ex. 15 replaces some of the DMD with the much more hydrophobic diisocyanate, dimer acid diisocyanate (DDI). A 3% polymer solution with 0.2% diethoxyacetophenone UV cures to a permanent hydrogel.

EXAMPLE 33

Polymer Ex. 18 is a reactive polymer prepared from a poly(EO) monoalcohol with a molecular weight about 5000. Thus, a majority of the reaction product with DMD and HEA is a mono-functional reactive polymer with the acrylate functionality adjacent to the hydrophobic reaction product from DMD. UV cure of 10% solutions with 0.2% DEAP on polymer produced a very weak friable gel.

Free radical initiation other than from radiation may be used. The catalyst may be one of the free-radical yielding initiators such as the inorganic persulfates, percarbonates, perborates, and the like, e.g., potassium persulfate, ammonium persulfate, or sodium persulfate; organic peroxides, e.g., benzoyl peroxide, acetyl peroxide, or di-ti-butyl peroxide, and organic hydroperoxides such as diisopropylbenzene hydroperoxide and the like which are usually employed in free radical type polymerization systems. Redox systems of initiators may also be employed utilizing the above noted initiators with suitable reducing agents known in the polymerization art. Examples 34 and 35 below illustrate the use of such initiators.

EXAMPLE 34

Polymer Ex. 3 at 10% solids was thermally cured in the presence of varying levels of ammonium persulfate (APS) in a 75° C. water bath. The cure results are given as follows:

TABLE IX

| Percent APS On Polymer | Cure Conditions | Cure Results Description | Swell Ratio |
|---|---|---|---|
| 0.007% | 75° C. water bath | 75% gel in 30 min | — |
| .035 | 75° C. water bath | firm gel in 15 min | — |
| .070 | 75° C. water bath | firm gel in 15 min | — |
| .70 | 75° C. water bath | firm gel in 15 min | 35 |
| 1.4 | 75° C. water bath | more elastic in 15 min | 41 |
| 2.1 | 75° C. water bath | loose, easily torn in 15 min | 41 |

EXAMPLE 35

Polymer Ex. 3 at 10% solids was cured using a redox catalyst system at room temperature as shown in Table X below:

TABLE X

| | Cure Results | |
|---|---|---|
| Initiator Description[a] | Description | Swell Ratio |
| 1.4% cumene hydroperoxide (CHP) 0.3% isoascorbic acid (IAA) $7 \times 10^{-4}$ Fe$^{++}$ | firm gel in 20 min; still gel next day | 33 |
| 5.6 CHP 1.2% IAA $28 \times 10^{-4}$% Fe$^{++}$ | 50% gel in 5 min. complete in 20 min; after 24 hrs. completely fluid again | — |

[a] % based on polymer

EXAMPLE 36

Polymer Ex. 3 at 10% solids was cured by a redox catalyst system with the objective of preparing small hydrogel beads. Two grams of 10% solution of Ex. 3 containing 1.4% CHP, 0.3% IAA, $7 \times 10^{-4}$% Fe$^{++}$ was stirred in 100 g of chlorobenzene and 50 g benzene with 0.5 g Sorbitan monooleate surfactant at room temperature under nitrogen. Stirring was continued for 5 minutes after a similar bulk sample had gelled. Hydrogel beads were filtered out; no coalescense occurred when in water; however, coalescence of beads occurred when the beads were dried.

EXAMPLE 37

Cure may also be effective in salt solutions. Polymer Ex. 2 with 1% DEAP (added as an emulsion of 9.1% DEAP ad 18.2% Triton X-102 followed by tumbling overnight) and water in 0.1M K$_2$HPO$_4$ solution at various polymer solids. Results are shown as follows:

TABLE XI

| Sample Description | | UV Exposure | Cure Results Description | Swell Ratio |
|---|---|---|---|---|
| A. Water solutions | | | | |
| 20% = | 1100 cps | 1 sec exposure | very stiff gel | 23/21[a] |
| 15% = | 340 | | very stiff gel | 33/26[a] |
| 10% | 82.5 | | firm gel | 49/28[a] |
| 5% | 11.8 | | highly elastic gel | 126/26[a] |
| 2.5% | 1.48 | | no reaction | — |
| B. 0.1 M K$_2$HPO$_4$ | | | | |
| 20% | | 1 sec | very stiff gel | 17[b] |
| 15% | | | | 20[b] |
| 10% | | | firm gel | 22[b] |
| 5% | | | elastic gel | 35[b] |
| 2.5 | | | stringy, viscous | |

[a] First value determined for swelling in deionized water; second value determined for swelling in 0.1 M K$_2$HOP$_4$.
[b] Value determined for swelling in 0.1 M K$_2$HPO$_4$.

EXAMPLE 38

Polymer Ex. 3 at 10% solids was initiated with 1.4% CHP, 0.3% IAA, $7 \times 10^{-4}$ Fe$^{2+}$ and immediately poured over Union Sand of mesh 100 or mesh 35-50. Cure times of the solution impregnating the sand is about that of bulk solutions. The sand gels were tough and slightly elastic when the gel was swelled in the water. The dried sand gels were hard and did not crumble but had good integrity, even after several swell dry cycles.

EXAMPLE 39

A 10% solution of polymer Ex. 7 with 1% DEAP on polymer solids was UV cured (2 second exposure in a shallow pan to produce a hydrogel sheet 12 inches × 8 inches and ¼ inch thick. The sheet was tough, flexible and elastic and could easily be peeled from the pan and handled without breaking.

EXAMPLE 40

The same solution of Ex. 39 was UV cured as a ½" thick slab by irradiating with a 2 sec UV exposure on each side. A tough, flexible and elastic hydrogel slab is produced.

EXAMPLE 41

A 15% solution of polymer Ex. 7 with 1% DEAP on polymer solids was poured over a single thickness of cheesecloth over a piece of glass plate. The excess wiped off by a glass rod to give a polymer solution film thickness roughly that of the cheesecloth fibers. The impregnated cheesecloth was UV cured by irradiating with a 2 second UV exposure on both sides. The cured impregnated cheesecloth could be swelled and dried over several cycles.

EXAMPLE 42

The solutions used in Examples 39 and 41 were UV cured using a low pressure mercury lamp (7.5 watt Mineral Lite) by a 2 minute exposure of ⅛" films to form permanent hydrogel.

EXAMPLE 43

A 20% solution of polymer Ex. 3 with 0.4% DEAP and 0.27 Dowacil 75 (a preservative to prevent bacterial growth on prepared hydrogels stored wet) was soaked into a sheet of Shur-Wipe ® Disposable Paper Wipes, the excess squeezed out and the impregnated paper UV-cured by a 2 second exposure on each side. The resultant cured gel impregnated in the paper was flexible but somewhat stiff.

EXAMPLE 44

A 10% solution of polymer Ex. 3 with 0.2% DEAP on polymer solids was UV-cured as a sheet ¼" thick by a 2.7 sec exposure from a touch elastic hydrogel. The hydrogel dried at ambient conditions is yellowish, hard, and very tough, sinks in water, and reswells to a clear gel in 2-3 hours. However, hydrogel sheet that was freeze-dried formed a white, soft and spongy material that floats on water and is much harder to wet than air dried material; also time to reswell the freeze-dried material was much longer for the air dried material.

EXAMPLE 45

Solutions of polymer Ex. 3 with 1% DEAP were UV cured at 10% and 20% polymer solids. Polymer solutions were UV cured on glass plates and covered immediately to retard evaporation. Gel sheet was stripped from the plate and placed between polyethylene sheet; 2½×⅞" sections in the shape of a dumbell with 1"×0.4" test sections were cut from the polyethylene-covered gel. Just before testing a thin film of oil was put on the gel to minimize volatile loss during testing. Evaluation was done on an Instron Table Model using a "B" cell calibrated to 100 g. full scale and a crosshead speed of 1" per minute. The results are given in Table XII.

TABLE XII

Elasticity of UV Cured Hydrogels

| Polymer Solids of Solution Before Cure | UV Exposure (sec) | Hydrogel Thickness (Mils) | Percent Elongation at Break | Instron Integrator Value |
|---|---|---|---|---|
| 10 | 0.67 | 18-22 | 500-800 | 1600-3500 (15 samples) |
| 20 | 0.67 | 18 | 700 | 7000-8000 (2 samples) |

EXAMPLE 46

Table XII shows the storage stability properties of uninitiated solutions of reactive polymer. If solutions are to be exposed to ambient UV radiation, lower concentrations are more stable if solutions are to be exposed to evaluated temperatures in the dark, high concentrations are better.

| Polymer Example | Weight % | Exposure Time | 140° F., Dark | CTR, Ambient Light |
|---|---|---|---|---|
| 2 | 10 | 10 days | OK | OK |
|   | 5  | 10 days | OK | OK |
|   | 10 | 13 days | OK | 20% gel |
|   | 5  | 13 days | 80% gel | OK |
| 4 | 10 | 10 days | OK | OK |
|   | 5  | 10 days | OK | OK |
|   | 3  | 10 days | 50% gel | OK |
|   | 10 | 13 days | OK | 60% gel |
|   | 5  | 13 days | 80% gel | 40% gel |
|   | 3  | 13 days | 80% gel | OK |

EXAMPLE 47

A 20% solution of polymer Ex. 6 was electron beam cured (Energy Sciences Inc. Electrocurtain ®) as a 20 mil thick film over glass to form a permanent hydrogel.

Further uses for the crosslinkable acrylate functional associative polymers of the present invention include latex paint additives in the form of microgel or high molecular weight polymers; microvoids and films prepared by drying the dispersed microgel; control release compositions formed by the swelling microgel or other form with solution of appropriate materials; soil stabilization obtained by gelling the monomer after the solution has soaked into the soil; water barriers in basement walls obtained by curing the gel in the cement after it is applied or after blocks of cementitious material are made or by soaking the porous walls with the crosslinkable acrylate functional associative polymers and then curing said polymers; bulking agents for use in the gastrointestinal tract, membranes with pore size controlled by molecular weight of the monomers or by the extent of cure; thin films as protective coatings in biomedical applications such as sheet hydrogels for synthetic skin and burn cases; dessicants obtained by curing in sawdust and powdering; freeze-dried hydrogels; and block water for non-leaking water beads or ship ballast.

The crosslinkable water soluble associative polymers of the present invention can be utilized in numerous coating applications analogous to those described above which would be readily recognizable by one of ordinary skill in the art. It is the intent of the appended claims to encompass obvious modifications of the crosslinkable water soluble associative polymers of the present invention and applications for their use.

I claim:

1. A crosslinkable associative water-compatible polymer composition comprising polymers having the formula:

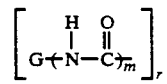

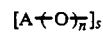

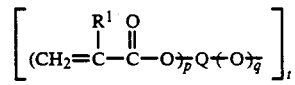

wherein r, s, and t are positive integers;
m is 2 or 3,
n is 1, 2 or 3.
p is 1 or 2,
q is 1, 2 or 3;
with the proviso that the number of equivalents of reactants having m, n or q equal to 3 is from 0 to 0.3 and fewer than one unit per number average molecule has m, n, or q equal to 3;

is the residue of an organic di- or tri-isocyanate;

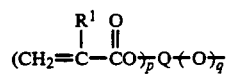

is the residue of a mono- or di-(meth) acrylic mono-, di- or tri-hydroxy alcohol, the subscript "q" denoting the hydroxy functionality of said alcohol;
A—O)$_n$ is the hydrophilic residue of a mono-, di- or tri-hydroxy polyether, the subscript "n" denoting the hydroxy functionality of said polyether; and R$^1$ is hydrogen or methyl;
the order of the groups in the formula not being significant except as required by the condensation polymerization reaction, the total number of carbon atoms in Q and G being twelve or more, and the composition of G and Q are such that when the residue of the isocyanate and the meth(acrylic) hydroxyl alcohol are adjacent they produce a hydrophobic reactive segment; which associates with the other hydrophobic reactive segments in solution provided further that the number average molecular weight of hydroxy-functional polyether from which said $A-O)_n$ residue is derived is greater than 3000 when said hydroxy-functional polyether has two hydroxyl groups, and less than about 20,000; and provided further that the polymer composition is prepared by reacting about 1.0 equivalent of isocyanate functionality, about 0.6 to 0.98 equivalent of hydroxyl functionality of said polyether and about 0.02 to 0.4 equivalent of hydroxyl functionality of the (meth)acrylic functional alcohol.

2. A process of producing a composition containing crosslinked associative polymer comprising preparing a solution of the polymer of claim 1 in a solvent selected from water, ($C_1$-$C_4$) alcohols and mixtures thereof, wherein the percent solids are from about 100% solids to about 1% solids, and initiating cure of the resulting solution.

3. A process according to claim 2 wherein the percent solids of the polymer of claim 1 is from about 10% to about 1% solids in solution.

4. A process according to claim 3 of curing the reactive polymers according to claim 2 which constitutes the additional step of adding initiators.

5. A process according to claim 4 wherein the initiators are added in an amount from about 0 to about 10% based upon polymer solids.

6. A process according to claim 5 wherein the initiators are water-insoluble or water-misicible initiators.

7. A process according to claim 6 wherein initiators are photoinitiators or photosensitizers and the polymer is radiation cured by exposure to ambient sunlight or to actinic radiation in the 200-800 nm range.

8. A process according to claim 6 wherein the initiators are thermal initiators and cure is by heat.

9. A process according to claim 6 wherein the initiators are redox initiators.

10. A process according to claim 3 which constitutes the additional step of curing the polymer according to claim 1 by exposure to ionizing radiation such as electron beam radiation.

11. A process according to claim 3 wherein the polymer is cured in the presence of a substrate material.

12. An article of manufacture having a cured coating of the polymer of claim 1.

* * * * *